United States Patent
Lai et al.

(10) Patent No.: US 10,882,995 B1
(45) Date of Patent: Jan. 5, 2021

(54) AZO COMPOUND AND BLACK DYE COMPOSITION INCLUDING THE SAME

(71) Applicant: National Chi Nan University, Puli (TW)

(72) Inventors: Long-Li Lai, Taichung (TW); Yao-Chih Lu, Puli (TW); Cheng-Hua Lee, Puli (TW)

(73) Assignee: National Chi Nan University, Puli (TW)

( * ) Notice: Subject to any disclaimer, the term of this patent is extended or adjusted under 35 U.S.C. 154(b) by 0 days.

(21) Appl. No.: 16/593,051

(22) Filed: Oct. 4, 2019

(30) Foreign Application Priority Data

Jul. 3, 2019 (TW) .............................. 108123384 A

(51) Int. Cl.
*C09B 29/00* (2006.01)
*C09B 29/036* (2006.01)
*C09B 29/52* (2006.01)

(52) U.S. Cl.
CPC ...... *C09B 29/0051* (2013.01); *C09B 29/3665* (2013.01)

(58) Field of Classification Search
CPC ............ C09B 29/0029; C09B 29/0051; C09B 29/3665
See application file for complete search history.

(56) References Cited

U.S. PATENT DOCUMENTS 4,565,424 A * 1/1986 Huffman ................. C09B 31/00
252/299.01

* cited by examiner

*Primary Examiner* — Bijan Ahvazi
(74) *Attorney, Agent, or Firm* — Quarles & Brady LLP

(57) ABSTRACT

Disclosed is an azo compound represented by Formula (I),

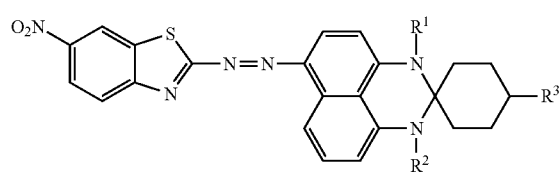

in which $R^1$ is hydrogen or methyl, $R^2$ is hydrogen or methyl, and $R^3$ is hydrogen, an unsubstituted linear alkyl group of from 1 to 4 carbon atoms, or an unsubstituted branched alkyl group of from 1 to 4 carbon atoms. This disclosure also provides a black dye composition including the azo compound represented by Formula (I).

8 Claims, 1 Drawing Sheet

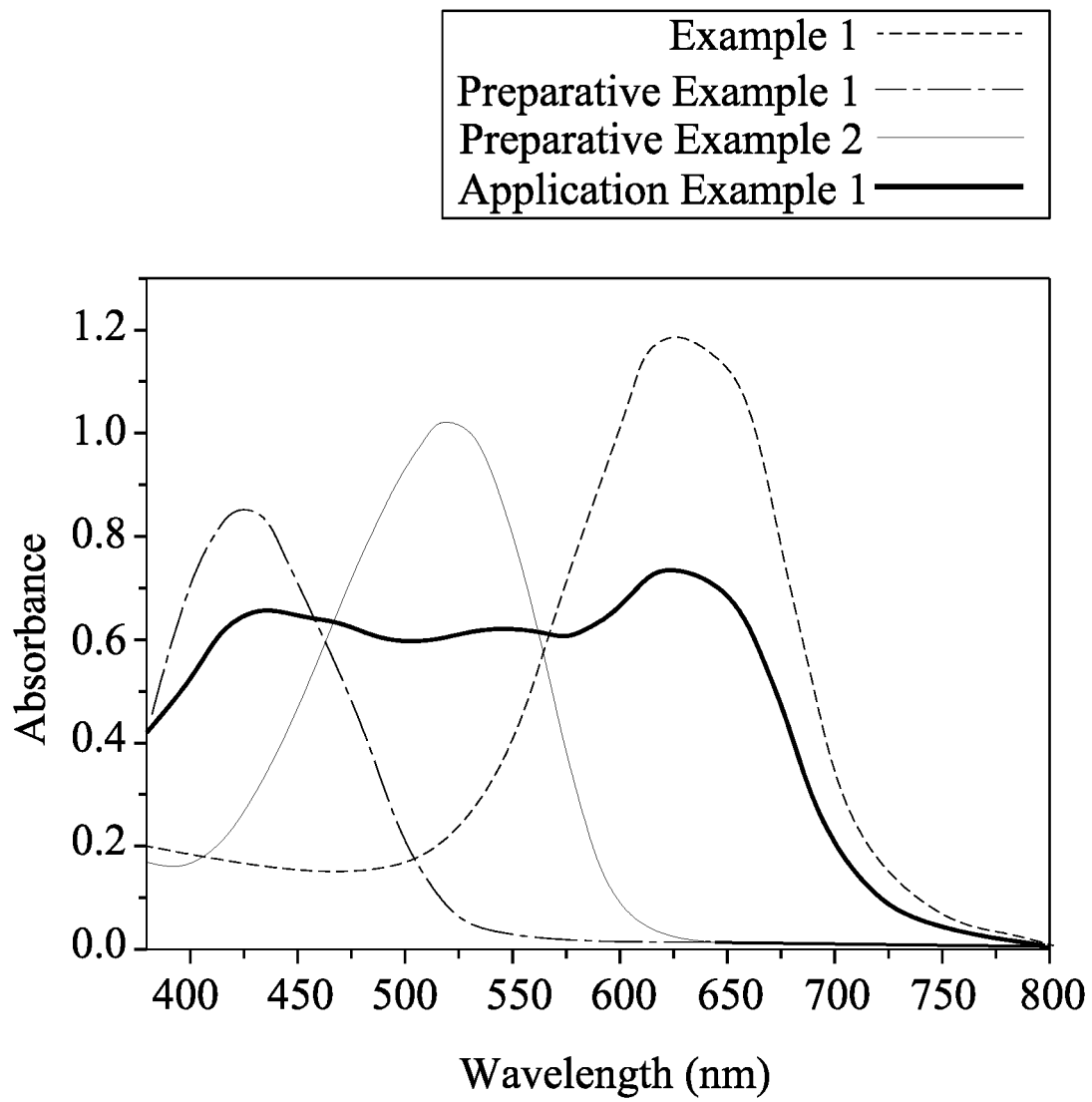

AZO COMPOUND AND BLACK DYE COMPOSITION INCLUDING THE SAME

CROSS-REFERENCE TO RELATED APPLICATION

This application claims priority of Taiwanese Invention Patent Application No. 108123384, filed on Jul. 3, 2019.

FIELD

This disclosure relates to an azo compound, and more particularly to an azo compound for serving as a dichroic azo dye. This disclosure also relates to a black dye composition including the azo compound.

BACKGROUND

Generally, the term "dichroic dye" refers to a dye having optical anisotropic property, i.e., a difference between $A_{//}$ and $A_\perp$, which represent the peak values of the absorbances when the polarization directions of a light are parallel and perpendicular, respectively, to the arranged direction of molecules of the dye. When $A_\perp$ is smaller than $A_{//}$, the dye is a positive dichroic dye, and when $A_\perp$ is larger than $A_{//}$, the dye is a negative dichroic dye. Dichroic dyes have been widely used in products such as elements for liquid crystal devices, lighting equipments, smart glass devices, etc.

WO 2011/157614A1 discloses a blue dye represented by Formula (B) below,

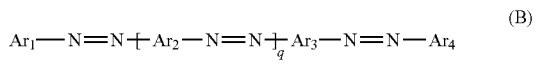

(B)

in which $Ar_1$, $Ar_2$, $Ar_3$, $Ar_4$, and q are as defined therein.

Although the aforesaid prior art discloses a blue dye which can be used with other dye colors to make a black dichroic dye, the process for preparing the blue dye requires two diazotization steps or more, and gives a low yield of the desired product.

SUMMARY

A first object of the disclosure is to provide an azo compound for serving as a dichroic azo dye. A second object of the disclosure is to provide a black dye composition including the azo compound.

According to a first aspect of the disclosure, an azo compound is represented by Formula (I),

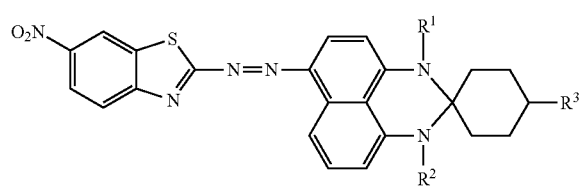

(I)

wherein
$R^1$ is hydrogen or methyl;
$R^2$ is hydrogen or methyl; and
$R^3$ is hydrogen, an unsubstituted linear alkyl group of from 1 to 4 carbon atoms, or an unsubstituted branched alkyl group of from 1 to 4 carbon atoms.

According to a second aspect of the disclosure, a black dye composition includes the aforementioned azo compound.

BRIEF DESCRIPTION OF THE DRAWINGS

Other features and advantages of the disclosure will become apparent in the following detailed description of the embodiment(s) with reference to the accompanying drawing, of which:

FIG. 1 is an absorption spectrum for an azo compound of Example 1, azo compounds of Preparative Examples 1 and 2, and a black dye composition of Application Example 1.

DETAILED DESCRIPTION

<Azo Compound>

An azo compound according to an embodiment of the disclosure is used for serving as a dichroic azo dye, and is represented by Formula (I),

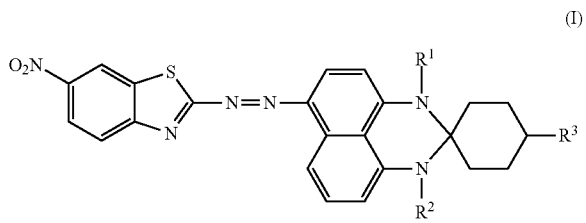

(I)

wherein
$R^1$ is hydrogen or methyl;
$R^2$ is hydrogen or methyl; and
$R^3$ is hydrogen, an unsubstituted linear alkyl group of from 1 to 4 carbon atoms, or an unsubstituted branched alkyl group of from 1 to 4 carbon atoms.

In certain embodiments, $R^1$ and $R^2$ are each hydrogen.
In certain embodiments, $R^1$ and $R^2$ are each methyl.
In certain embodiments, $R^1$, $R^2$, and $R^3$ are each methyl.

A method for preparing the azo compound as represented by Formula (I) may include a step of subjecting 2-amino-6-nitrobenzothiazole and a compound as represented by Formula (i-1) below to a reaction,

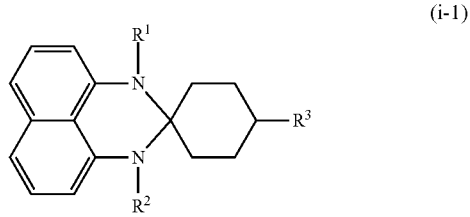

(i-1)

in which $R^1$, $R^2$, and $R^3$ are as defined above.

<Black Dye Composition>

A black dye composition according to an embodiment of the disclosure includes the aforementioned azo compound represented by Formula (I).

In certain embodiments, the black dye composition further includes an azo compound represented by Formula (II),

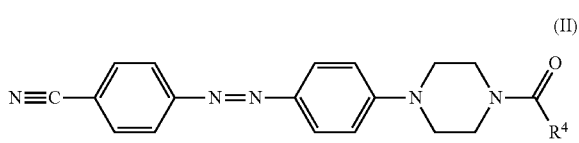

wherein R⁴ is an unsubstituted linear alkyl group of from 5 to 9 carbon atoms.

In certain embodiments, the black dye composition further includes an azo compound represented by Formula (III),

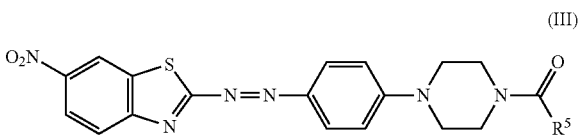

wherein R⁵ is an unsubstituted linear alkyl group of from 5 to 9 carbon atoms.

In certain embodiments, the black dye composition includes both the azo compounds represented by Formulas (II) and (III).

Examples of the disclosure will be described hereinafter. It is to be understood that these examples are exemplary and explanatory and should not be construed as a limitation to the disclosure.

Preparative Example 1 [the Azo Compound Represented by Formula (II)]

1.62 g (10 mmol) of 1-phenylpiperazine was added into a 100 mL reaction flask, and then 20 mL of dried dichloromethane was added for dissolving 1-phenylpiperazine. After cooling the reaction flask in an ice water bath of 0° C., 1.63 g (10 mmol) of octanoyl chloride was gradually dropped into the reaction flask for a reaction thereof for 30 minutes. Thereafter, 3.04 g (30 mmol) of triethylamine was slowly added to the reaction flask for another reaction thereof for 30 minutes. Next, the flask was removed from the ice water bath and allowed to return to room temperature for another reaction for 4 hours, so as to obtain a crude product. The crude product was extracted using 30 mL of 0.5 M sodium hydroxide aqueous solution twice, to collect a first organic layer. After then, 50 mL of water was added to the first organic layer for another extraction to collect a second organic layer. Subsequently, the second organic layer was dehydrated using anhydrous magnesium sulfate (MgSO₄), followed by filtration to collect a filtrate. Dichloromethane in the filtrate was removed using an evaporator, followed by recrystallization in a mixed solvent of dichloromethane and n-hexane, thereby obtaining a product of 2.64 g.

The spectrum analysis for the product is: ¹H NMR (300 MHz, CDCl₃), δ (ppm): 7.29 (dd, 2H, $J_1$=6.9, $J_2$=8.4), 6.95-6.88 (m, 3H), 3.78 (t, 2H, J=5.1), 3.63 (t, 2H, J=4.8), 3.19-3.13 (m, 4H), 2.36 (t, 2H, J=7.5), 1.70-1.60 (m, 2H), 1.33-1.29 (m, 8H), 0.88 (t, 3H, J=6.6). The product was confirmed to be 1-octanoyl-4-phenylpiperazine (9.2 mmol) having a chemical structure represented by

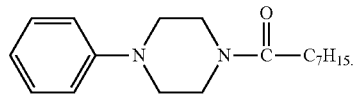

1.77 g (15 mmol) of 4-aminobenzonitrile was added into a 100 mL reaction flask, and then 30 mL of concentrated hydrochloric acid was added for dissolving the 4-aminobenzonitrile. After cooling the reaction flask in an ice water bath of 0° C., 1.17 g (17 mmol) of sodium nitrite was gradually added into the reaction flask for a reaction thereof for 1 hour. Thereafter, 1.65 g (15 mmol) of sodium tetrafluoroborate was added into the reaction flask for another reaction thereof for 1 hour to obtain a mixture. Subsequently, the mixture was filtrated to collect a diazonium salt filter cake, followed by washing using diethyl-ether.

2.64 g (9.2 mmol) of the previously obtained 1-octanoyl-4-phenylpiperazine was added into a 100 mL reaction flask, and 75 mL of 10 M acetic acid aqueous solution and the previously obtained diazonium salt filter cake were subsequently added into the reaction flask for a reaction thereof for 6 hours. The content of the reaction flask was then added to 600 mL of water by pouring to precipitate orange solids, followed by filtration to collect the orange solids. The orange solids were subjected to recrystallization in a mixed solvent of dichloromethane and n-hexane, so as to obtain a product (1.57 g, 40.8% yield).

The spectrum analysis for the product is: ¹H NMR (300 MHz, CDCl₃), δ (ppm): 7.91 (d, 2H×2, J=8.7), 7.76 (d, 2H, J=8.7), 6.96 (d, 2H, J=9.0), 3.81 (t, 2H, J=5.1), 3.67 (t, 2H, J=4.5), 3.45-3.38 (m, 4H), 2.37 (t, 2H, J=7.5), 1.71-1.61 (m, 2H), 1.32-1.29 (m, 8H), 0.88 (t, 3H, J=4.5). The product was confirmed to be an azo compound having a chemical structure represented by

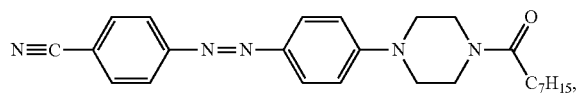

which resembles the azo compound represented by Formula (II).

Preparative Example 2 [the Azo Compound Represented by Formula (III)]

1.95 g (10 mmol) of 2-amino-6-nitrobenzothlazole was added into a 100 mL reaction flask, and then 20 mL of 50% sulfuric acid solution was added for dissolving 2-amino-6-nitrobenzothlazole. After cooling the reaction flask in an ice water bath of 0° C., sodium nitrite aqueous solution (0.76 g of sodium nitrite and 1 mL of water) was gradually added into the reaction flask for a reaction thereof for 40 minutes to obtain a first solution.

2.31 g (8 mmol) of 1-octanoyl-4-phenylpiperazine was added into a 25 mL reaction flask, and then 8 mL of acetic acid solution was added to obtain a second solution. In an environment of 0° C., the second solution was slowly added to the first solution for a reaction thereof for 8 hours, so as to obtain a crude product. The crude product was added to 200 mL of water to precipitate red solids, followed by filtration to collect the red solids. Next, the red solids were subjected to column chromatography (dichloromethane: ethyl acetate=4:1) for purification, thereby obtaining a product (2.15 g, 54.4% yield).

The spectrum analysis for the product is: ¹H NMR (300 MHz, CDCl₃), δ (ppm): 8.76 (d, 1H, J=1.8), 8.33 (dd, 1H, $J_1$=2.1, $J_2$=9.0), 8.15 (d, 1H, J=9.0), 8.03 (d, 2H, J=9.0), 6.94 (d, 2H, J=9.3), 3.84 (s, 2H), 3.71 (s, 2H), 3.59 (s, 4H), 2.38 (t, 2H, J=7.2), 1.69-1.65 (m, 2H), 1.33-1.29 (m, 8H), 0.88 (d, 3H, J=6.6). The product was confirmed to be an azo compound having a chemical structure represented by

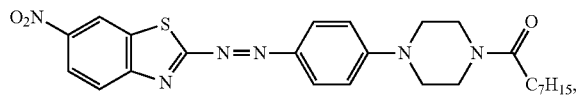

which resembles the azo compound represented by Formula (III).

Example 1: [the Azo Compound Represented by Formula (I)]

15.82 g (100 mmol) of 1,8-diaminonaphthalene and 13.46 g (120 mmol) of 4-methylcyclohexanone were added into a 500 mL reaction flask, and then 250 mL of ethanol was added for dissolving the contents in the reaction flask. While the reaction flask was heated to and maintained at 60° C. for 6 hours, the content in the reaction flask was stirred for a reaction thereof, so as to obtain a reaction product. Then, the ethanol in the reaction product was removed using an evaporator to obtain a crude product. Next, the crude product was dissolved in 200 mL of dichloromethane and extracted three times using water to collect an organic layer. The organic layer was dehydrated using anhydrous magnesium sulfate ($MgSO_4$), followed by filtration to collect a filtrate. Subsequently, dichloromethane in the filtrate was removed using an evaporator to obtain a product of 22.71 g.

The spectrum analysis for the product is: $^1$H NMR (300 MHz, DMSO-$D_6$), δ (ppm): 7.11 (t, 1H, J=7.8), 7.09 (t, 1H, J=7.5), 6.88 (d, 1H, J=8.1), 6.87 (d, 1H, J=8.1), 6.58 (d, 1H, J=7.5), 6.37 (d, 1H, J=6.9), 6.36 (s, 1H), 6.16 (s, 1H), 1.85-1.82 (m, 2H), 1.54-1.40 (m, 7H), 0.94 (d, 3H, J=6.6). The product was confirmed to be 1,3-dihydro-2,2-(3'-methylpentylene)perimidine (90 mmol) having a chemical structure represented by

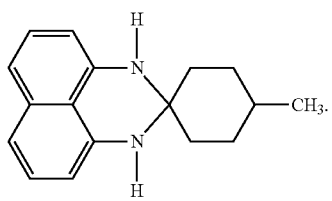 [SMILES: CC1CCC2(CC1)Nc1cccc3cccc(c13)N2]

12.62 g (50 mmol) of the previously obtained 1,3-dihydro-2,2-(3'-methylpentylene)perimidine, 13.82 g (100 mmol) of potassium carbonate, 12.5 mL (200 mmol) of iodomethane, and 50 mL of 1-methyl-2-pyrrolidone were added into a 100 mL pressure-resistant reaction flask to obtain a mixture. The mixture was stirred until no bubble was released. Then, the reaction flask was sealed and heated to 60° C. so that the contents therein were reacted for 3 hours, so as to obtain a reaction product. The reaction product was then cooled to room temperature and was extracted three times using a mixed solution including 100 mL of toluene and 200 mL of water, so as to collect an organic layer. Subsequently, the organic layer was dehydrated using anhydrous magnesium sulfate ($MgSO_4$), followed by filtration to collect a filtrate. Toluene in the filtrate was removed using an evaporator to obtain a crude product, which was subjected to column chromatography using hexane as an eluent, thereby obtaining a product of 8.43 g.

The spectrum analysis for the product is: $^1$H NMR (300 MHz, DMSO-$D_6$), δ (ppm): 7.37 (dd, 1H, $J_1$=1.5, $J_2$=8.1), 7.33 (t, 1H, J=6.9), 7.27 (t, 1H, J=7.8), 7.11 (d, 1H, J=8.4), 6.92 (dd, 1H, $J_1$=1.8, $J_2$=7.2), 6.54 (d, 1H, J=8.4), 2.84 (s, 3H), 2.61 (s, 3H), 1.74-1.70 (m, 2H), 1.60-1.22 (m, 7H), 0.90 (d, 3H, J=5.4). The product was confirmed to be 1,3-dimethyl-2,2-(3'-methylpentylene)perimidine (30.1 mmol) having a chemical structure represented by

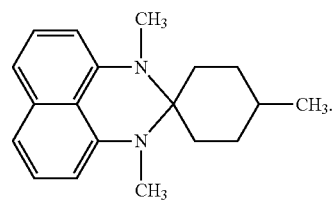 [SMILES: CC1CCC2(CC1)N(C)c1cccc3cccc(c13)N2C]

0.98 g (5 mmol) of 2-amino-6-nitrobenzothiazole was added into a 50 mL reaction flask, and then 10 mL of 50 wt % sulfuric acid solution was added for dissolving 2-amino-6-nitrobenzothiazole. After cooling the reaction flask in an ice water bath of 0° C., sodium nitrite aqueous solution (0.36 g of sodium nitrite and 0.5 mL of water) was gradually added into the reaction flask for a reaction thereof for 40 minutes to obtain a first solution.

1.54 g (5.5 mmol) of the previously obtained 1,3-dimethyl-2,2-(3'-methylpentylene)perimidine was added into a 50 mL reaction flask, and then 30 mL of acetic acid was added to obtain a second solution. In an environment of 0° C., the second solution was slowly added to the first solution. Then, the reaction flask was removed from the ice water bath and allowed to return to room temperature so that the contents therein were reacted for 6 hours, so as to obtain a reaction product. Thereafter, the reaction product was added to 500 mL of water to precipitate bluish-green solids, followed by filtration to collect the bluish-green solids. The bluish-green solids were subjected to column chromatography for purification using dichloromethane as an eluent, so as to obtain a product (0.43 g, 17.6% yield).

The spectrum analysis for the product is: $^1$H NMR (300 MHz, $CDCl_3$), δ (ppm): 8.70 (s, 1H), 8.63-8.52 (dd, 1H, $J_1$=7.50, $J_2$=8.7), 8.36 (d, 1H, J=9.3), 8.28 (d, 1H, J=8.7), 8.02 (d, 1H, J=9.0), 7.64 (dd, 1H, $J_1$=8.1, $J_2$=15.9), 7.15-7.00 (dd, 1H, $J_1$=7.5, $J_2$=7.2), 6.73 (t, 1H, J=10.5), 3.32-3.24 (2s, 3H), 2.79-2.71 (2s, 3H), 2.08-1.75 (m, 7H), 1.33-1.25 (m, 2H), 1.01 (d, 3H, J=9.0). The product was confirmed to be an azo compound having a chemical structure represented by

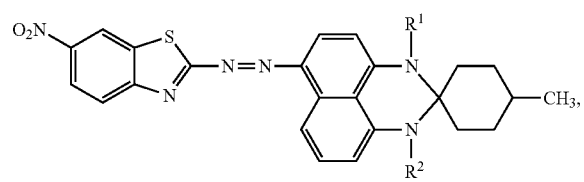

which resembles the azo compound represented by Formula (I).

Application Example 1 (Black Dye Composition)

0.09 g of the azo compound of Example 1, 0.075 g of the azo compound of Preparative Example 1, and 0.07 g of the azo compound of Preparative Example 2 were blended to obtain a black dye composition.

Evaluations:

Light Absorbance Test

Each of the azo compounds of Example 1, Preparative Examples 1 and 2, and the black dye composition of Application Example 1 was dissolved in dichloromethane to obtain a test solution. Next, the test solution was measured using a spectrometer (Manufacturer: PerkinElmer; Model: Lambda 900 UV-VIS-NIR). For the test solution of each of the Example 1 and Preparative Examples 1 and 2, a concentration of the respective azo compound therein was $2 \times 10^{-5}$ M. For the test solution of the black dye composition of Application Example 1, the concentrations of the azo compounds of Example 1 and Preparative Examples 1 and 2 therein were $1.11 \times 10^{-5}$ M, $1.01 \times 10^{-5}$ M, and $8.5 \times 10^{-6}$ M, respectively. The absorption spectrums of the azo compounds of Example 1 and Preparative Examples 1 and 2, and the black dye composition of Application Example 1 are as illustrated in FIG. 1, and the maximum absorption wavelengths of each of the azo compounds of Example 1, Preparative Examples 1 and 2 are listed below in Table 1.

Dichroic Ratio 0.05 g of the azo compound of Example 1 was dissolved in 2.45 g of a commercially available nematic liquid crystal E7 (purchased from JiangSu Hecheng Display Technology Co., Ltd. (HCCH)), followed by heating to obtain a clear and transparent mixture. Then, the transparent mixture was sealed in a liquid crystal cell and was measured using a spectrometer (Manufacturer: Ocean Optics; Model: USB4000) and a polarizer. A dichroic ratio of the azo compound of Example 1 was calculated according to the formula below, $$\text{Dichroic ratio} = \frac{A_{//}}{A_\perp} = \frac{\varepsilon_{//}}{\varepsilon_\perp}$$

in which $A_{//}$ and $A_\perp$ represent peak values of the absorbances of the azo compound of Example 1 when the polarization direction of a polarized light are parallel and perpendicular, respectively, to the arranged directions of the molecules of the azo compound, and $\varepsilon_{//}$ and $\varepsilon_\perp$ are absorption coefficients calculated respectively from $A_{//}$ and $A_\perp$ of the azo compound of Example 1. The dichroic ratio for each of the azo compounds of Preparative Examples 1 and 2 was calculated in a similar manner. The results are listed in Table 1 below.

Heat Stability Test

The azo compound of Example 1 was disposed in a thermogravimetric analyzer (Manufacturer: PerkinElmer; Model: Pyris 1 TGA) and heated to 900° C. at a rate of 5° C./min, so as to record a thermal decomposition temperature thereof. The azo compounds of the Preparative Examples 1 and 2 were also subjected to the heat stability test in a similar manner. The results are listed below in Table 1.

TABLE 1

|  | Example 1 | Preparative Example 1 | Preparative Example 2 |
|---|---|---|---|
| Maximum Absorption Wavelength (nm) | 625.08 | 448.41 | 517.27 |
| $\varepsilon_{//}$ (μm$^{-1}$) | 13.72 | 24.33 | 8.59 |
| $\varepsilon_\perp$ (μm$^{-1}$) | 3.30 | 4.85 | 1.89 |
| Dichroic Ratio | 4.16 | 5.02 | 4.54 |

TABLE 1-continued

|  | Example 1 | Preparative Example 1 | Preparative Example 2 |
|---|---|---|---|
| Thermal Decomposition Temperature (° C.) | 203 | 224 | 268 |

As shown in Table 1, the azo compound of Example 1 has a maximum absorption wavelength of 625.08 nm, and therefore, the azo compound of Example 1 appears to be bluish-green. As such, the azo compound represented by Formula (I) may serve as a blue dye. In addition, each of the azo compounds of Example 1 and Preparative Examples 1 and 2 has a great difference between the values of $\varepsilon_{//}$ and $\varepsilon_\perp$, which indicates that these azo compounds may also have a great difference between the values of $A_{//}$ and $A_\perp$. Therefore, azo compounds represented by Formulas (I), (II), (III) may have dichroic properties. Moreover, the thermal decomposition temperature of each of the azo compounds of Example 1 and Preparative Examples 1 and 2 was above 200° C., indicating that azo compounds represented by Formulas (I), (II), (III) may have a good thermal stability.

In sum, the blue azo compound of the disclosure was designed based on the chemical structure of azo-1,3-dihydroperimidine, and requires only one diazotization step during manufacture thereof. In addition, the resulting azo compound is not only bluish in color and dichroic, but also has a good thermal stability.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, FIGURE, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiment but is intended to cover various arrangements included within the spirit and scope of the broadest interpretation so as to encompass all such modifications and equivalent arrangements.

What is claimed is:

1. An azo compound represented by Formula (I)

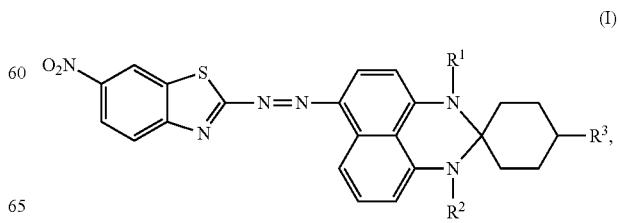

wherein
- $R^1$ is hydrogen or methyl;
- $R^2$ is hydrogen or methyl; and
- $R^3$ is hydrogen, an unsubstituted linear alkyl group of from 1 to 4 carbon atoms, or an unsubstituted branched alkyl group of from 1 to 4 carbon atoms.

2. The azo compound according to claim 1, wherein $R^1$ and $R^2$ are each hydrogen.

3. The azo compound according to claim 1, wherein $R^1$ and $R^2$ are each methyl.

4. The azo compound according to claim 1, wherein $R^1$, $R^2$, and $R^3$ are each methyl.

5. A black dye composition comprising said azo compound of claim 1.

6. The black dye composition according to claim 5, further comprising an azo compound represented by Formula (II),

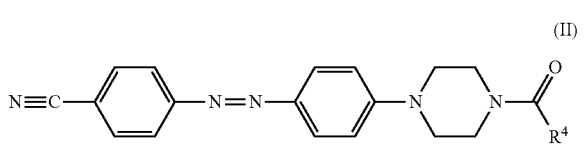

wherein $R^4$ is an unsubstituted linear alkyl group of from 5 to 9 carbon atoms.

7. The black dye composition according to claim 6, further comprising an azo compound represented by Formula (III),

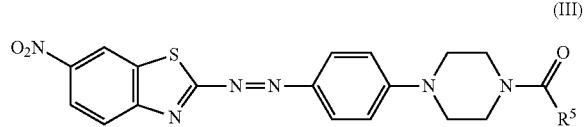

wherein $R^5$ is an unsubstituted linear alkyl group of from 5 to 9 carbon atoms.

8. The black dye composition according to claim 5, further comprising an azo compound represented by Formula (III)

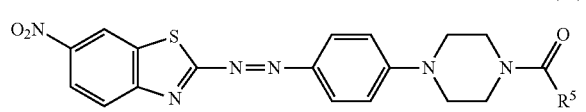

wherein $R^5$ is an unsubstituted linear alkyl group of from 5 to 9 carbon atoms.

* * * * *